(12) United States Patent
Mori et al.

(10) Patent No.: US 8,663,342 B2
(45) Date of Patent: Mar. 4, 2014

(54) PROCESS FOR PRODUCING NITROGEN-CONTAINING COMPOSITION

(75) Inventors: Yoshiaki Mori, Mie (JP); Gou Takahashi, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 40 days.

(21) Appl. No.: 13/548,851

(22) Filed: Jul. 13, 2012

(65) Prior Publication Data

US 2013/0177495 A1    Jul. 11, 2013

Related U.S. Application Data

(63) Continuation of application No. PCT/JP2011/050453, filed on Jan. 13, 2011.

(30) Foreign Application Priority Data

Jan. 15, 2010   (JP) ................................ 2010-007306

(51) Int. Cl.
    *B01D 9/00*     (2006.01)

(52) U.S. Cl.
    USPC ...................................... 23/302 A; 23/295 R

(58) Field of Classification Search
    USPC ........................................... 23/302 A, 295 R
    See application file for complete search history.

(56) References Cited

U.S. PATENT DOCUMENTS

| | | | |
|---|---|---|---|
| 3,264,060 A | 8/1966 | Nieswandt et al. | |
| 5,426,219 A | 6/1995 | Lehnhardt et al. | |
| 5,958,744 A | 9/1999 | Berglund et al. | |
| 2007/0015264 A1 | 1/2007 | Isotani et al. | |
| 2007/0062231 A1 | 3/2007 | Spindler et al. | |

FOREIGN PATENT DOCUMENTS

| | | |
|---|---|---|
| DE | DD 289 259 A5 | 4/1991 |
| EP | 0 126 058 A1 | 11/1984 |
| JP | 48-30239 B | 9/1973 |
| JP | 51-122699 A | 10/1976 |
| JP | 5-213615 A | 8/1993 |
| JP | 9-500649 A | 1/1997 |
| JP | 2001-514900 A | 9/2001 |
| JP | 2004-10408 A | 1/2004 |
| JP | 2005-139137 A | 6/2005 |
| JP | 2005-295998 A | 10/2005 |
| JP | 2007-511461 A | 5/2007 |

OTHER PUBLICATIONS

International Search Report issued Apr. 12, 2011 in PCT/JP2011/050453.

*Primary Examiner* — Edward Johnson
(74) *Attorney, Agent, or Firm* — Oblon, Spivak, McClelland, Maier & Neustadt, L.L.P.

(57) ABSTRACT

The invention provides a process comprising: a crystallization step of concentrating and crystallizing the ammonium salt of sulfuric acid from an aqueous solution that contains the ammonium salt of sulfuric acid; a solid-liquid separation step of solid-liquid separating the ammonium salt of sulfuric acid obtained in the crystallization step, and a crystallization mother liquid recycling step of recycling a crystallization mother liquid obtained in the solid-liquid separation step to at least one step selected from the crystallization step and one or more steps that precede the crystallization step, in which not all of the crystallization mother liquid is recycled.

15 Claims, 2 Drawing Sheets

PROCESS FOR PRODUCING NITROGEN-CONTAINING COMPOSITION

TECHNICAL FIELD

The present invention relates to a method which includes adding sulfuric acid to an aqueous solution containing an aliphatic carboxylic acid ammonium salt obtained from glucose, cellulose, and the like, which are biological starting materials, through a microbial conversion and recovering the aliphatic carboxylic acid, and in which the sulfuric acid ammonium salt that has generated as a by-product and a nitrogen-containing composition that contains by-products of the fermentation are recovered.

BACKGROUND ART

Aliphatic carboxylic acids such as succinic acid and adipic acid are being extensively used as starting materials for synthesizing foods, medicines, and other chemical products. These aliphatic carboxylic acids have conventionally been produced industrially from petroleum-derived starting materials. In recent years, however, various aliphatic carboxylic acids can be produced from a wide range of biological starting materials by a fermentation operation using microorganisms while attaining a high carbon yield. For example, succinic acid, adipic acid, and the like can be produced by fermentation.

The starting materials to be used in the production of aliphatic carboxylic acids through fermentation generally are saccharides such as glucose, grape sugar, and cellulose. However, there are cases where polysaccharides are contained as impurities and where the saccharides used as starting materials are not completely assimilated by the microorganisms and partly remain to come into the aliphatic carboxylic acids. Furthermore, although it is widely known that ammonia is used as a neutralizer in microbial fermentation, amino acids also generate as by-products in this case.

In the case where ammonia is used as a neutralizer, the aliphatic carboxylic acids in the fermentation broth are present in the form of ammonium salts. For recovering the aliphatic carboxylic acids, it is necessary to subject the carboxylic acid salts to salt interchange with an acid. When sulfuric acid is used as the acid, the ammonium salt of sulfuric acid generates as a by-product together with the aliphatic carboxylic acids.

There are many reports on methods for recovering such aliphatic carboxylic acids. Meanwhile, there are almost no report on a method for recovering the by-product ammonium salt of sulfuric acid, although this ammonium salt contains by-products of the fermentation in a large amount and is useful as a fertilizer.

A crystallization method is a general method for recovering the ammonium salt of sulfuric acid from an aqueous solution containing the ammonium salt of sulfuric acid. Usually, this method frequently involves recycling of the crystallization mother liquid in order to obtain a sufficiently high recovery percentage of the ammonium salt of sulfuric acid.

SUMMARY OF THE INVENTION

Problems that the Invention is to Solve

However, when an aqueous solution containing a sulfuric acid ammonium salt which contains by-products of fermentation is subjected to crystallization to recover the sulfuric acid ammonium salt and the resultant crystallization mother liquid is recycled, then the by-products of fermentation accumulate in the recycling system and this exerts adverse influences on the crystallization and the succeeding solid-liquid separation; for example, the accumulated by-products increase the viscosity of the liquid.

On the other hand, in the case where the ammonium salt of sulfuric acid is to be recovered without recycling the crystallization mother liquid, the aqueous solution must be directly dried. However, the direct drying of the aqueous solution is limited not only in dryers usable therefor but also in the ability thereof.

A subject for the invention is to provide a method which includes adding sulfuric acid to an aqueous solution containing an aliphatic carboxylic acid ammonium salt obtained from glucose, grape sugar, cellulose, and the like, which are biological starting materials, through a microbial conversion and recovering the aliphatic carboxylic acid, and in which the sulfuric acid ammonium salt that has generated as a by-product and a nitrogen-containing composition that contains by-products of the fermentation are stably and efficiently recovered.

Means for Solving the Problems

The present inventors diligently made investigations in order to overcome the problems described above. As a result, the inventors have found that those problems can be eliminated with the production process of the invention described below. Furthermore, the nitrogen-containing composition obtained by the production process of the invention was ascertained to be useful as a nitrogenous fertilizer. The invention has been thus completed.

Essential points of the invention reside in the following [1] to [12].

[1] A process for producing a nitrogen-containing composition from an aqueous solution which contains an ammonium salt of aliphatic carboxylic acid obtained from a biological starting material, while recovering at least one member selected from an aliphatic carboxylic acid, a salt of aliphatic carboxylic acid and an ammonium salt of sulfuric acid from the solution, wherein the process comprises the following steps (1) to (3):

(1) a crystallization step of concentrating and crystallizing the ammonium salt of sulfuric acid from an aqueous solution that contains the ammonium salt of sulfuric acid, (2) a solid-liquid separation step of solid-liquid separating the ammonium salt of sulfuric acid obtained in the crystallization step, and (3) a crystallization mother liquid recycling step of recycling a crystallization mother liquid obtained in the solid-liquid separation step to at least one step selected from the crystallization step and one or more steps that precede the crystallization step, in which not all of the crystallization mother liquid is recycled.

[2] The process for producing a nitrogen-containing composition according to the [1], which further comprises a crystallization mother liquid drying step of evaporating to dryness, the crystallization mother liquid obtained in the solid-liquid separation step with a dryer to recover an ammonium salt of sulfuric acid.

[3] The process for producing a nitrogen-containing composition according to the [1] or [2], which comprises: a contact step of adding sulfuric acid to the aqueous solution that contains an ammonium salt of aliphatic carboxylic acid obtained from a biological starting material and, thereafter, mixing and contacting the aqueous solution with a solvent capable of phase separation; and a phase separation step of phase separating the liquid after the contact step.

[4] The process for producing a nitrogen-containing composition according to the [3], which comprises an organic-solvent removal step of distilling the aqueous solution resulting from the phase separation step to remove the solvent from the aqueous solution.

[5] The process for producing a nitrogen-containing composition according to the [4], which comprises a concentration step of concentrating the aqueous solution from which the organic solvent has been removed to increase the concentration of the ammonium salt of sulfuric acid in the aqueous solution.

[6] The process for producing a nitrogen-containing composition according to any one of the [3] to [5], which comprises a raffinate neutralization step of adding an alkali to the aqueous solution resulting from the phase separation step to adjust the pH to a value in the range of 4-8.

[7] The process for producing a nitrogen-containing composition according to the [6], wherein the alkali to be used in the raffinate neutralization step is ammonia.

[8] The process for producing a nitrogen-containing composition according to the [6] or [7], wherein the raffinate neutralization step is conducted after the organic-solvent removal step.

[9] The process for producing a nitrogen-containing composition according to any one of the [6] to [8], wherein the raffinate neutralization step is conducted before the concentration step.

[10] The process for producing a nitrogen-containing composition according to any one of [1] to [9], wherein the total amount of organic acids, saccharides, amino acids, and proteins contained in the crystallization mother liquid to be recycled in the crystallization mother liquid recycling step is 0.1-15% by weight based on the crystallization mother liquid obtained in the solid-liquid separation step.

[11] The process for producing a nitrogen-containing composition according to the [10], wherein the total amount of organic acids contained in the crystallization mother liquid to be recycled in the crystallization mother liquid recycling step is 0.1-10% by weight based on the crystallization mother liquid obtained in the solid-liquid separation step.

[12] The process for producing a nitrogen-containing composition according to any one of the [1] to [9], wherein the amount of the crystallization mother liquid to be recycled in the crystallization mother liquid recycling step is 10% by weight or more but less than 80% by weight based on the crystallization mother liquid obtained in the solid-liquid separation step.

[13] A nitrogen-containing composition produced by the process for production according to any one of the [1] to [12], wherein a total amount of nitrogen contained in the nitrogen-containing composition is 15% by weight or more but less than 21% by weight and at least 90% by weight of the total nitrogen is ammonium nitrogen.

[14] A fertilizer material which comprises the nitrogen-containing composition according to the [13].

[15] A fertilizer which comprises the nitrogen-containing composition according to the [13].

Effects of the Invention

According to the process of the invention, in a method of recovering an aliphatic carboxylic acid from an aqueous solution that contains an ammonium salt of the aliphatic carboxylic acid obtained from a biological starting material, the sulfuric acid ammonium salt having generated as a by-product and a nitrogen-containing composition containing by-products of fermentation are effectively and stably recovered.

MODES FOR CARRYING OUT THE INVENTION

Figure 1:
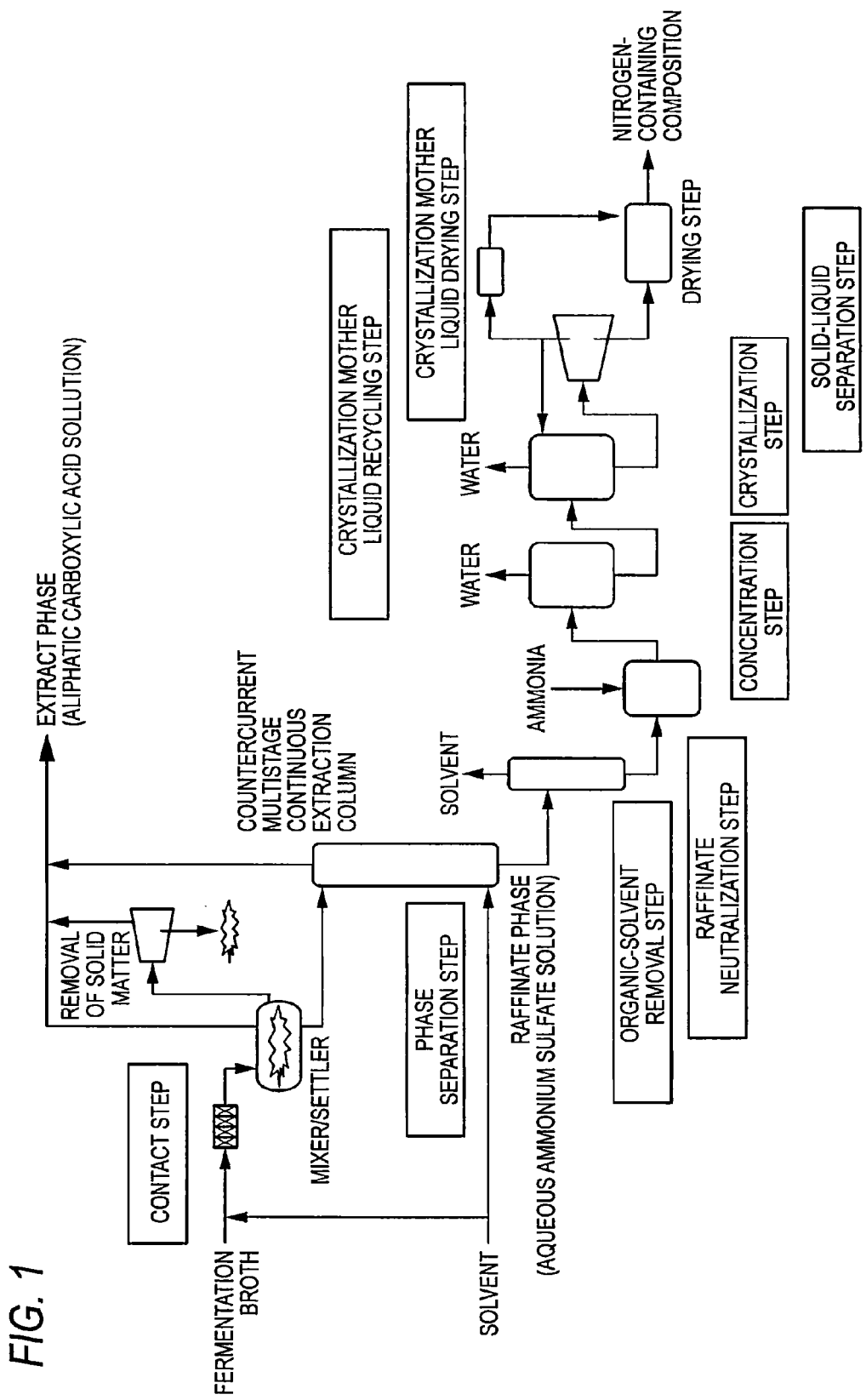
FIG. 1 is a chart which shows one embodiment of the process for producing a nitrogen-containing composition.

Modes for carrying out the invention are explained below in detail. The following explanations on constituent elements are for representative embodiments of the invention, and various modifications of the invention can be made within the spirit of the invention.

The process of the invention for producing a nitrogen-containing composition is a process in which at least one member selected from an aliphatic carboxylic acid, a salt of the aliphatic carboxylic acid, and the ammonium salt of sulfuric acid is recovered from an aqueous solution which contains an ammonium salt of the aliphatic carboxylic acid obtained from a biological starting material, and the nitrogen-containing composition is produced from the solution, the process including the following steps (1) to (3):

(1) a crystallization step of concentrating and crystallizing the ammonium salt of sulfuric acid from an aqueous solution that contains the ammonium salt of sulfuric acid, (2) a solid-liquid separation step of solid-liquid separating the ammonium salt of sulfuric acid obtained in the crystallization step, and (3) a crystallization mother liquid recycling step of recycling a crystallization mother liquid obtained in the solid-liquid separation step to at least one step selected from the crystallization step and one or more steps that precede the crystallization step, in which not all of the crystallization mother liquid is recycled.

<Crystallization Step>

In the crystallization step, the ammonium salt of sulfuric acid is crystallized by concentration from an aqueous solution which contains the sulfuric acid ammonium salt. In the crystallization by concentration, water is vaporized from the aqueous solution which contains the sulfuric acid ammonium salt, and the concentration of the sulfuric acid ammonium salt is increased to and above the solubility thereof, thereby precipitating the sulfuric acid ammonium salt.

The crystallization may be conducted at either ordinary pressure or a reduced pressure. However, when the crystallization is conducted at a reduced pressure, the heat of vaporization of the water cools the aqueous solution which contains the sulfuric acid ammonium salt, and precipitation due to the temperature dependence of the solubility of the sulfuric acid ammonium salt can also be expected. The crystallization at a reduced pressure hence is preferred from the standpoint of yield.

In particular, the crystallization pressure is regulated to preferably 1–50 kPa, more preferably 2–20 kPa. The crystallization temperature, which is governed by the operation pressure, is regulated to preferably 5-80° C., more preferably 10-60° C.

By regulating the crystallization pressure to 1 kPa or higher, the equipment for pressure reduction can be rendered small and the water which has vaporized can be easily recovered through condensation. By regulating the crystallization pressure to 50 kPa or lower, the crystallization temperature can be prevented from becoming too high and the yield of the sulfuric acid ammonium salt can be improved.

Devices for attaining a reduced pressure are not particularly limited. However, a water or steam ejector is preferred from the standpoints of maintenance and control. For the condensation of the vaporized water, a barometric condenser is widely used.

The crystallization may be conducted either by a batch operation or by a continuous operation. However, a continuous operation is preferred, for example, because the sulfuric acid ammonium salt can be efficiently crystallized and the salt can be produced using a smaller amount of energy for the crystallization and because unevenness of crystal size can be reduced. There is no need of using a special crystallization vessel as a crystallization device, and a known stirring vessel can be used.

<Solid-Liquid Separation Step>

The sulfuric acid ammonium salt slurry obtained by the crystallization is separated into sulfuric acid ammonium salt crystals and a crystallization mother liquid by an operation for solid-liquid separation. Methods for the separation are not particularly limited, and examples thereof include separation by filtration and separation by sedimentation. The operation may be batchwise or continuous.

Examples of efficient solid-liquid separators include continuous centrifugal filters and centrifugal settlers, e.g., a decanter. The wet cake recovered through the operation for solid-liquid separation can be rinsed with cold water or the like according to the desired purity of the sulfuric acid ammonium salt.

The sulfuric acid ammonium salt crystals recovered are usually dried. Although methods for drying are not particularly limited, examples thereof include band type dryers, rotary dryers, and fluidized-bed dryers. Since there are cases where the crystals are mixed in a dryer with the sulfuric acid ammonium salt obtained in the crystallization mother liquid drying step which will be described later, it is preferred to use a rotary dryer, a fluidized-bed dryer, or the like.

<Crystallization Mother Liquid Recycling Step>

Some of the crystallization mother liquid obtained in the solid-liquid separation step is recycled to at least one step selected from the crystallization step and one or more steps which precede the crystallization step. In the production process of the invention, however, not all of the crystallization mother liquid is recycled.

The amount of the crystallization mother liquid to be recycled cannot be determined unconditionally because the amount thereof depends on the composition and properties of the crystallization mother liquid. However, the amount thereof is preferably at least 10% by weight, more preferably at least 20% by weight, even more preferably at least 30% by weight, especially preferably at least 40% by weight, of the crystallization mother liquid. Meanwhile, the amount thereof is preferably less than 99% by weight, more preferably less than 90% by weight, even more preferably less than 80% by weight, especially preferably less than 75% by weight.

The crystallization mother liquid contains not only the ammonium salt of sulfuric acid but also various coexistent substances formed by fermentation, such as organic acids, e.g., malic acid, amino acids, e.g., alanine and valine, proteins, and saccharides. In case where the crystallization mother liquid is wholly recycled, these coexistent substances accumulate in the recycling system and the liquid present in the recycling system increases in viscosity, raising difficulties in the crystallization step and the solid-liquid separation step.

In case where the crystallization mother liquid is treated with activated carbon in order to remove the coexistent substances or the amount of the crystallization mother liquid to be recycled is reduced, this results in a decrease in the amount of the nitrogen-containing composition produced or an increase in the number of treatment steps and hence in a decrease in production efficiency. Such a method therefore is undesirable.

Consequently, the total amount of the organic acids, saccharides, amino acids, and proteins which are contained in the crystallization mother liquid to be recycled in the crystallization mother liquid recycling step is preferably 0.1-15% by weight, more preferably up to 10% by weight, based on the crystallization mother liquid obtained in the solid-liquid separation step, throughout the whole recycling step.

Furthermore, the total amount of the organic acids contained in the crystallization mother liquid to be recycled in the crystallization mother liquid recycling step is preferably 0.1-10% by weight, more preferably up to 8% by weight, based on the crystallization mother liquid obtained in the solid-liquid separation step, throughout the whole recycling step.

It is preferred that the viscosity of the crystallization mother liquid at the temperature to be used for the crystallization should be regulated to 0.5-100 cP by controlling the amount of the crystallization mother liquid to be recycled. The viscosity thereof is more preferably 1-50 cP, even more preferably 1-20 cP.

By regulating the viscosity of the crystallization mother liquid to 100 cP or less, the crystallization mother liquid is prevented from exerting adverse influences especially on the solid-liquid separation step. In the case where solid-liquid separation is conducted by means of a continuous centrifugal settler such as, for example, a decanter, such crystallization mother liquid is prevented from coming to have too high a viscosity and is effective in inhibiting the rate of crystal sedimentation from decreasing and in preventing the solid-liquid separation from becoming impossible. From the standpoint of inhibiting the viscosity of the crystallization mother liquid from increasing, it is preferred that the concentration of the nonvolatile components other than the sulfuric acid ammonium salt in the crystallization mother liquid should be regulated to 30% by weight or less.

<Crystallization Mother Liquid Drying Step>

The crystallization mother liquid which has been separated contains various impurities formed by fermentation, such as, for example, organic acids, amino acids, proteins, and saccharides, besides the ammonium salt of sulfuric acid, and is effective as a liquid fertilizer or a raw material therefor. It is, however, possible to directly dry the crystallization mother liquid to recover these substances as a powder.

Methods for the drying are not particularly limited. However, in preferred methods for recovering a powder from the liquid, dryers such as a spray dryer and a disk dryer are used. The recovered composition, which contains the sulfuric acid ammonium salt, can be mixed with the sulfuric acid ammonium salt obtained in the crystallization step.

<Contact Step and Phase Separation Step>

The process of the invention for producing an aliphatic carboxylic acid includes: a contact step in which an aqueous solution that contains both an aliphatic carboxylic acid and the ammonium salt of sulfuric acid is brought into contact with a solvent capable of undergoing phase separation from the aqueous solution; and a phase separation step in which the liquid is caused to undergo phase separation after the contact step.

In the phase separation step, it is possible to recover a solvent phase (hereinafter often referred to as extract phase), a phase which contains the solid matter that has generated at the phase interface (hereinafter often referred to as intermediate phase), and an aqueous-solution phase (hereinafter often referred to as raffinate phase) in the following manner.

In the case where the contact step is to be conducted by a batch operation, use may be made, for example, of a method in which a solvent capable of undergoing phase separation from the aqueous solution that contains both an aliphatic carboxylic acid and the ammonium salt of sulfuric acid is added to and contacted and sufficiently mixed with the aqueous solution and, thereafter, an extract phase, an intermediate phase, and a raffinate phase can be separately recovered in the phase separation step, for example, by taking out these phases through discharge ports disposed around the respective phases or by successively taking out the phases from the bottom of the vessel in which the contacting was performed. The intermediate phase, which contains solid matter in a large amount, can be taken out together with the extract phase or can be taken out together with the raffinate phase.

In the case where the contact step is to be conducted, for example, by a continuous operation, a contacting device (hereinafter often referred to as mixer/settler type extractor) which is constituted of a mixer part having a mixer for contacting and mixing the aqueous solution containing both an aliphatic carboxylic acid and the ammonium salt of sulfuric acid with a solvent capable of phase separation from the aqueous solution and a settler part having a settler to be applied to a step in which the liquid mixture obtained by the contacting and mixing is allowed to stand still and thereby undergo phase separation (hereinafter often referred to as phase separation step) is used to conduct the phase separation step, in which an extract phase, an intermediate phase, and a raffinate phase each can be recovered in the settler part.

(Contacting Device)

The contacting device may be any device so long as the device can be used to bring the aqueous solution containing both an aliphatic carboxylic acid and the ammonium salt of sulfuric acid into contact with a solvent and as it is possible to recover a solvent phase and an aqueous-solution phase and to remove solid matter. However, the mixer/settler type extractor is preferred because this device is simple and is easy to operate.

The mixer may be of any type so long as the aqueous solution containing both an aliphatic carboxylic acid and the ammonium salt of sulfuric acid is sufficiently mixed with a solvent capable of undergoing phase separation from the aqueous solution. Examples thereof include vessels having a stirrer and static mixers.

However, in the case where a vessel having a stirrer is used, bubbles of air or the like which have come into the vessel as a result of the stirring may adhere to the generated solid matter to considerably inhibit the solid matter from undergoing phase separation in the succeeding settler part. It is therefore preferred to stir the liquid mixture under such conditions that air or the like does not come into the liquid mixture. It is preferred that the mixer should be a static mixer from the standpoints of the allowable range of operation and equipment cost.

(Phase Separation Device)

The settler may be of any type so long as the liquid obtained by bringing the aqueous solution containing both an aliphatic carboxylic acid and the ammonium salt of sulfuric acid into contact with a solvent capable of undergoing phase separation from the aqueous solution can undergo phase separation therein. Examples thereof include a device for recovering each of an extract phase, an intermediate phase, and a raffinate phase by means of one vessel, a device for recovering each of an extract phase, an intermediate phase, and a raffinate phase by means of a plurality of vessels, and a device in which each phase is recovered through centrifugal separation attained with a rotating device.

The intermediate phase, which contains solid matter in a large amount, usually contains at least one liquid selected from between a liquid of the extract phase and a liquid of the raffinate phase. It is therefore possible to subject the intermediate phase to solid-liquid separation and separate and recover at least one liquid selected from between a liquid of the extract phase and a liquid of the raffinate phase.

The liquid recovered can be reused in a step to be conducted after the phase separation step or can be reused in a step conducted before the contact step. Such method is preferred because the reuse can heighten the efficiency of production of the aliphatic carboxylic acid and/or the sulfuric acid ammonium salt.

Methods for the solid-liquid separation are not particularly limited, and use can be made of separation by sedimentation, separation by filtration, or the like. In the separation by sedimentation, the solid matter may be separated by sedimentation in the gravitational filed or may be separated by sedimentation in a centrifugal-force field. From the standpoint of heightening the rate of sedimentation, separation by centrifugal sedimentation is desirable.

The mode of operation for the solid-liquid separation may be a batch operation or a continuous operation. Examples of continuous centrifugal settlers include screw decanters and disk type centrifugal settlers. With respect to the separation by filtration, methods therefor are classified by filter medium, filtration pressure, continuous/batch operation, etc. However, each of such methods is not particularly limited so long as the solid matter can be separated from the extract phase and/or the raffinate phase.

It is, however, preferred that the filter medium should have an opening size of 0.1-10 μm. In case where the opening size thereof is less than 0.1 μm, there is a possibility that use of this filter medium might result in too low a permeation flux and, hence, the filtration might require too long a period. On the other hand, in case where the opening size thereof is larger than 10 μm, there is a possibility that separation of the solid matter might be insufficient.

The material of the filter medium must be insoluble in the solvent, and it is preferred to use a filter medium made of a fluororesin such as polytetrafluoroethylene. The filtration can be any of vacuum filtration, pressure filtration, and centrifugal filtration, and may be conducted in a continuous mode or a batch mode.

(Solvent)

The solvent to be used in the contact step is not particularly limited so long as the solvent undergoes phase separation from the aqueous solution containing both an aliphatic carboxylic acid and the ammonium salt of sulfuric acid. However, the inorganic value/organic value ratio (hereinafter often abbreviated to I/O value) thereof is preferably 0.2-2.3, more preferably 0.3-2.0. By using a solvent having an I/O value within that range, the aliphatic carboxylic acid can be selectively extracted and efficiently separated from the impurities and from the sulfuric acid ammonium salt.

The boiling point of the solvent at ordinary pressure (1 atm) is preferably 40° C. or higher, more preferably 60° C. or higher. The boiling point thereof is preferably 120° C. or lower, more preferably 100° C. or lower, especially preferably 90° C. or lower.

When a solvent having a boiling point within that range is used, it is possible to avoid the risk of solvent vaporization and catching fire, the problem that a solvent vaporizes to reduce the efficiency of extraction of the aliphatic carboxylic acid, and the problem that a solvent is difficult to recycle.

There also is an advantage that a small quantity of heat suffices when the solvent which has been used is separated by a method such a distillation or is purified and reused.

The inorganic value and organic value are proposed in Yūki Gainenzu-ron ["Systematic Organic Quantitative Analysis", FUJITA Atushi, Kazamashobo Co., Ltd. (1974)]; the organic value and inorganic value of an organic compound are calculated from the values preset for the functional groups constituting the organic compound, and the ratio is determined therefrom.

Examples of solvents having an I/O value of 0.2-2.3 and a boiling point at ordinary pressure of 40° C. or higher include ketone solvents such as methyl ethyl ketone, methyl isobutyl ketone, and acetone, ether solvents such as tetrahydrofuran and dioxane, ester solvents such as ethyl acetate, nitrile solvents such as acetonitrile, and alcohols having 3 or more carbon atoms, such as propanol, butanol, and octanol.

The I/O value and boiling point of each solvent are shown in the following table.

TABLE 1

IO values of solvents

| | I | O | I/O | Boiling point |
|---|---|---|---|---|
| Tetrahydrofuran | 30 | 80 | 0.375 | 66.0 |
| Methyl ethyl ketone | 65 | 60 | 1.083 | 79.6 |
| Methyl isobutyl ketone | 65 | 120 | 0.542 | 94.2 |
| Acetone | 65 | 40 | 1.625 | 56.1 |
| Acetonitrile | 70 | 40 | 1.750 | 81.1 |
| Ethyl acetate | 85 | 80 | 1.063 | 77.2 |
| Propanol | 100 | 60 | 1.667 | 97.2 |
| Isobutanol | 100 | 70 | 1.429 | 108.0 |
| Octanol | 100 | 160 | 0.625 | 179.8 |
| Dioxane | 40 | 80 | 0.500 | 101.3 |

In this contact step, the aliphatic carboxylic acid is selectively extracted and incorporated into the solvent, and the saccharides, amino acids, and inorganic salts are distributed mainly to the aqueous-solution phase. Thus, the former and the latter can be efficiently separated from each other. The sulfuric acid ammonium salt is substantially wholly recovered and incorporated into the aqueous-solution phase.

The sulfuric acid ammonium salt is subjected to treatments such as concentration, crystallization, and drying together with the amino acids and saccharides recovered and incorporated into the aqueous-solution phase. Thus, the amino acids and the saccharides can be recovered as the sulfuric acid ammonium salt which contains organic matter. This sulfuric acid ammonium salt is useful as a fertilizer since the salt contains a moderate amount of organic matter.

(Contacting Operation)

The operation for bringing the aqueous solution containing both an aliphatic carboxylic acid and the ammonium salt of sulfuric acid with a solvent capable of phase separation from the aqueous solution, in the contact step, may be conducted in one step or in a plurality of steps. It is, however, preferred to conduct the operation in a plurality of steps. The solvent may be caused to flow either cocurrently or countercurrently with respect to the aqueous solution containing both an aliphatic carboxylic acid and the ammonium salt of sulfuric acid.

The contact step may be conducted either continuously or batchwise. An especially preferred embodiment is shown in FIG. 1. As shown in FIG. 1, the preferred embodiment includes mixing the aqueous solution containing both an aliphatic carboxylic acid and the ammonium salt of sulfuric acid with a solvent by means of a mixer/settler, subsequently conducting liquid-liquid separation, separating and recovering each of an extract phase, an intermediate phase, and a raffinate phase, subjecting the intermediate phase to solid-liquid separation, and optionally subjecting the separated and recovered liquid to phase separation and then returning the separated phases to any step conducted after the phase separation step.

Through the contact step, in which the solvent described above is brought into contact with the aqueous solution containing both an aliphatic carboxylic acid and the ammonium salt of sulfuric acid, the aliphatic carboxylic acid is extracted and incorporated into the solvent. In this operation, the solvent is added in such an amount that the volume thereof is preferably 0.5-5 times, more preferably 1-3 times, the volume of the aqueous solution containing the aliphatic carboxylic acid as measured at the temperature used for the contacting.

The temperature at which the solvent is brought into contact with the aqueous solution containing both an aliphatic carboxylic acid and the ammonium salt of sulfuric acid is not particularly limited so long as the aliphatic carboxylic acid is extracted at the temperature. However, the temperature is preferably 30-60° C. By regulating the contacting temperature to 30° C. or higher, the solvent is prevented from increasing in viscosity, the time period required for the generated solid matter to precipitate is shortened, and the solid matter can be prevented from suspending in the solvent phase and from coming into the solvent phase. On the other hand, when the contacting temperature is 60° C. or lower, the aliphatic carboxylic acid moves to the solvent phase to a higher degree, resulting in a high degree of extraction and satisfactory efficiency.

The period of contacting is not particularly limited so long as the aliphatic carboxylic acid is sufficiently extracted within the period. The contacting period is usually preferably about 1 second to 5 hours, although the period depends also on the contacting device and contacting conditions. By using a contacting period of 1 second or longer, the aliphatic carboxylic acid is sufficiently extracted and incorporated into the solvent phase. By using a contacting period of 5 hours or shorter, the contacting device is prevented from being unnecessarily large and is rendered efficient, and the proteins coexistent with the aliphatic carboxylic acid are inhibited from being altered by the solvent, and a reduction in solid-matter amount can be attained.

The pressure for the contacting is not particularly limited so long as the aliphatic carboxylic acid is sufficiently extracted at the pressure. However, in the case where the contacting is continuously conducted, it is usually preferred to operate the device at atmospheric pressure.

(Phase Separation Operation)

The phase separation operation in the phase separation step can be accomplished by allowing the mixture to stand still in a vessel for a given period or can be performed with a centrifugal separator. The mixer/settler type extractor described above has a settler part in which the liquid mixture obtained by the contacting and mixing is allowed to stand still and thereby undergo phase separation. By allowing the liquid to stand still in the settler part for a given period, the liquid can be separated into phases. The phase separation step may be conducted continuously or batchwise.

The temperature to be used for the phase separation is not particularly limited so long as the liquid mixture can be separated into phases at the temperature. However, the temperature is preferably 30-60° C., and it is preferred to conduct the treatment at a temperature which is approximately the same as the temperature used for the contacting operation. By regulating the phase separation temperature to 30° C. or higher, not only the liquid is prevented from increasing in viscosity and the separation of solid matter is rendered easy, but also the solid matter is prevented from coming into the solvent phase and the solvent is inhibited from coming into the solid matter. By regulating the phase separation temperature to 60° C. or lower, the aliphatic carboxylic acid can be prevented from undergoing back extraction with the aqueous solution during the phase separation.

The period of the phase separation operation is not particularly limited so long as the liquid mixture is separated into phases. The period thereof is usually preferably about 1 minute to 5 hours, although the period depends also on the contacting device, contacting conditions, and the method of phase separation. By using a phase separation period of 1 minute or longer, the liquid mixture is sufficiently separated into phases, the aqueous solution or the solid matter is prevented from coming into the solvent phase, and the solvent or the solid matter is prevented from coming into the aqueous-solution phase. On the other hand, by using a separation period of 5 hours or shorter, the phase separation device is prevented from being unnecessarily large and is rendered efficient.

The pressure for the phase separation is not particularly limited so long as the aliphatic carboxylic acid is sufficiently extracted at the pressure. However, in the case where the phase separation operation is continuously conducted, it is usually preferred to operate the device at atmospheric pressure.

<Organic-Solvent Removal Step>

Since the raffinate phase recovered contains a solvent in an amount of several percents, it is necessary to remove the solvent. Namely, the raffinate phase obtained in the extraction step is subjected to a distillation operation to remove the solvent. Methods for the distillation and operation conditions are not particularly limited. However, the content of the solvent in the bottoms finally remaining after the distillation is preferably 1% by weight or less, more preferably 0.1% by weight or less, even more preferably 0.01% by weight or less.

That is, the solvent may be distilled off by simple distillation or distilled off by means of a distillation column while refluxing the distillate, according to the solvent used. The operation may be conducted at ordinary pressure or a reduced pressure. The operation may be continuous or batchwise. The solvent recovered can be reused as an extractant.

<Concentration Step>

The concentration of the ammonium salt of sulfuric acid in the aqueous solution which has undergone the organic-solvent removal step is generally low. It is therefore desirable to concentrate the aqueous solution to a degree close to the solubility within the crystallization step. The concentration may be conducted simultaneously with the organic-solvent removal or may be conducted after the organic-solvent removal. However, since the method in which the concentration is conducted simultaneously with the removal of the organic solvent necessitates a larger distillation apparatus, it is preferred to employ a method in which the concentration is conducted after the organic solvent is distilled off with a distillation column.

Methods and devices for the concentration are not particularly limited. For example, the operating conditions may include either ordinary pressure or a reduced pressure. The operation may be continuous or batchwise. Examples of the devices include the heating can type and the thin-film evaporation type. Furthermore, from the standpoint of energy saving, use can be made of a multi-effect evaporator, a heat pump, or the like.

<Raffinate Neutralization Step>

The raffinate phase usually is acidic. It is therefore preferred, for using the recovered sulfuric acid ammonium salt as a fertilizer or a fertilizer materials, that an alkali should be added to the raffinate phase to thereby substantially neutralize the raffinate phase. Here, it is preferred to use ammonia as the alkali to adjust the pH to about 4-8.

The neutralization may be conducted in any step. However, since there is the fear of apparatus corrosion in steps in which the acidic raffinate phase is handled at a high temperature, it is preferred to neutralize the raffinate phase in a step which is as earlier as possible. However, it is more preferred to conduct the neutralization after the solvent removal. This is because in case where the neutralization is conducted before the solvent removal step, the solvent recovered has a color. The reason why the solvent recovered through solvent removal after the neutralization has a color is unclear.

<Other Step>

(Salt Interchange of Aliphatic Carboxylic Acid Ammonium Salt with Sulfuric Acid)

In a fermentation broth, aliphatic carboxylic acids are present in the form of aliphatic carboxylic acid ammonium salts. For recovering an aliphatic carboxylic acid from the fermentation broth, it is preferred to first convert the aliphatic carboxylic acid ammonium salt to the aliphatic carboxylic acid. Namely, it is preferred that sulfuric acid is added to the aliphatic carboxylic acid ammonium salt to conduct salt interchange and thereby convert the salt and the sulfuric acid into the aliphatic carboxylic acid and the ammonium salt of sulfuric acid.

<Nitrogen-Containing Composition>

The nitrogen-containing composition to be produced by the invention contains not only the ammonium salt of sulfuric acid but also various compounds which were generated by fermentation and are inevitably coexistent, such as, for example, organic acids, amino acids, proteins, and saccharides, and is useful as a fertilizer materials, etc. Furthermore, it is also effective to mix the ammonium salt of sulfuric acid with, for example, a product obtained by drying the microorganism used in the fermentation.

<Aliphatic Carboxylic Acid>

Examples of the aliphatic carboxylic acid in the invention include chain carboxylic acids having 2-40 carbon atoms, such as oxalic acid, succinic acid, glutaric acid, adipic acid, sebacic acid, malic acid, fumaric acid, oxaloacetic acid, 2-oxaloglutaric acid, cis-aconitic acid, and dodecanedioic acid. Preferred of these are adipic acid and succinic acid.

In the invention, these aliphatic carboxylic acids are ones derived from a biological starting material. Examples of the biological starting material include wood, rice straw, rice hulls, rice bran, long-stored rice, corn, sugar canes, cassava, sago palms, bean curd refuse, corncobs, tapioca refuse, bagasse, vegetable oil refuse, potatoes, buckwheat, soybeans, oils and fats, old newspapers, papermaking residues, aquatic-product residues, livestock excreta, sewage sludge, and waste foods.

Preferred of these are plant resources such as wood, rice straw, rice hulls, rice bran, long-stored rice, corn, sugar canes, cassava, sago palms, bean curd refuse, corncobs, tapioca refuse, bagasse, vegetable oil refuse, potatoes, buckwheat, soybeans, oils and fats, old newspapers, and papermaking residues.

More preferred are wood, rice straw, rice hulls, long-stored rice, corn, sugar canes, cassava, sago palms, potatoes, oils and fats, old newspapers, and papermaking residues. Most preferred are corn, sugar canes, cassava, and sago palms.

These biological starting materials generally contain nitrogen element and many alkali metals and alkaline earth metals including Na, K, Mg, and Ca.

These biological starting materials are induced to carbon sources through known steps for pretreatment/saccharification, such as, for example, a chemical treatment with an acid, alkali, etc., a biological treatment with a microorganism, and a physical treatment, without particular limitations.

Those steps are not particularly limited, and examples thereof include a size reduction step in which a biological starting material is reduced into a small size by chipping, shaving, mashing, etc. Examples thereof optionally further include a pulverization step in which the starting material is treated with a grinder or a mill.

The biological starting material which has been thus reduced in size is further subjected to steps for pretreatment/saccharification and thereby inducted to a carbon source. Specific examples of methods therefor include chemical methods such as an acid treatment with a strong acid, e.g., sulfuric acid, nitric acid, hydrochloric acid, or phosphoric acid, an alkali treatment, ammonia freezing/steam explosion, solvent extraction, treatment with a supercritical fluid, and treatment with an oxidizing agent, physical methods such as pulverization, steam explosion, microwave treatment, and irradiation with electron beams, and biological treatments such as hydrolysis by a treatment with a microorganism or enzyme.

As the carbon sources induced from those biological starting materials, use is generally made of di- and polysaccharides such as hexoses, e.g., glucose, mannose, galactose, fructose, sorbose, and tagatose, pentoses, e.g., arabinose, xylose, ribose, xylulose, and ribulose, maltose, sucrose, lactose, trehalose, starch, and cellulose, fatty acids such as butyric acid, caproic acid, caprylic acid, capric acid, lauric acid, myristic acid, palmitic acid, palmitoleic acid, stearic acid, oleic acid, linoleic acid, linolenic acid, monoctic acid, arachidic acid, eicosanic acid, arachidonic acid, behenic acid, erucic acid, docosapentaenoic acid, docosahexaenoic acid, lignoceric acid, and selacholeic acid, and fermentable sugars such as glycerol, mannitol, xylitol, and ribitol. Preferred of these are glucose, maltose, fructose, sucrose, lactose, trehalose, and cellulose.

In the invention, aliphatic carboxylic acids are induced from those carbon sources induced from biological starting materials. Specifically, carboxylic acids are synthesized from those carbon sources, for example, by a fermentation method based on a microbial conversion, a chemical conversion method including a reaction step such as hydrolysis, dehydration reaction, hydration reaction, oxidation reaction, or reduction reaction, and a combination of the fermentation method and the chemical conversion method. Preferred of these is a fermentation method based on a microbial conversion by a microorganism having the ability to produce an aliphatic carboxylic acid.

The microorganism having the ability to produce an aliphatic carboxylic acid is not particularly limited so long as the microorganism has the ability to produce an aliphatic carboxylic acid. Examples thereof include enteric bacteria such as *Escherichia coli*, bacteria belonging to the genus *Bacillus*, and Coryneform bacteria. It is preferred to use an aerobic microorganism, a facultative anaerobic microorganism, or a microaerophilic microorganism.

Examples of the aerobic microorganism include Coryneform bacteria, bacteria belonging to the genus *Bacillus*, bacteria belonging to the genus *Rhizobium*, bacteria belonging to the genus *Arthrobacter*, bacteria belonging to the genus *Mycobacterium*, bacteria belonging to the genus *Rhodococcus*, bacteria belonging to the genus *Nocardia*, and bacteria belonging to the genus *Streptomyces*. More preferred of these are Coryneform bacteria.

The Coryneform bacteria are not particularly limited so long as the bacteria are classified as the group. Examples thereof include bacteria belonging to the genus *Corynebacterium*, bacteria belonging to the genus *Brevibacterium*, and bacteria belonging to the genus *Arthrobacter*. Preferred of these are bacteria belonging to the genus *Corynebacterium* or *Brevibacterium*. More preferred are bacteria classified as *Corynebacterium glutamicum*, *Brevibacterium flavum*, *Brevibacterium ammoniagenes*, or *Brevibacterium lactofermentum*.

In the case where a succinic-acid-producing bacterium is to be used as a bacterium which produces an aliphatic carboxylic acid, it is preferred to employ a strain which has enhanced pyruvate carboxylase activity and reduced lactate dehydrogenase activity, as in the Examples which will be given later.

Reaction conditions for the microbial conversion, such as reaction temperature and pressure, depend on the activity of the microorganism to be selected, such as cells, mold, etc. Conditions suitable for obtaining a carboxylic acid may be selected according to each case.

In microbial conversions, as the pH decreases, the microorganisms decrease in metabolic activity or become dormant, resulting in an impaired product yield or in the death of the microorganisms. Consequently, it is usually preferred to use a neutralizer. It is usually preferred that the pH of the system should be measured with a pH sensor and the pH be regulated so as to be within a given pH range by adding a neutralizer.

It is preferred that the pH value should be regulated so as to be within a range where the activity of the microorganism used, e.g., cells or mold, is most effectively exhibited, according to the kind of the microorganism. Methods for adding a neutralizer are not particularly limited, and either continuous addition or intermittent addition may be used.

Examples of the neutralizer in the invention include ammonia and ammonium carbonate.

In the invention, the fermentation broth obtained through a microbial conversion may be suitably concentrated while taking account of handleability and efficiency which are required in the subsequent purification steps. Methods for the concentration are not particularly limited. Examples thereof include a method in which an inert gas is passed, a method in which the water is partly distilled off by heating, a method in which the water is partly distilled off at a reduced pressure, and a method in which these methods are used in combination.

In the case where a fermentation broth is to be used in the process of the invention, it is preferred to use a fermentation broth from which the microorganism has been removed. Although methods for removing the microorganism are not particularly limited, use may be made of separation by sedimentation, centrifugal separation, separation by filtration, a combination of these methods, etc.

Industrially, it is preferred to remove the microorganism by a method such as centrifugal separation or separation by membrane filtration. For the centrifugal separation, use can be made of centrifugal sedimentation, centrifugal filtration, or the like.

In the centrifugal separation, operating conditions therefor are not particularly limited. However, it is usually preferred to separate the microorganism at a centrifugal force of 100-100,000 G. The operation may be either continuous or batchwise.

In the separation by membrane filtration, use can be made of microfiltration and/or ultrafiltration, etc. The material of the membrane is not particularly limited, and use can be made of either an organic membrane of a polyolefin, polysulfone, polyacrylonitrile, poly(vinylidene fluoride), or the like or a membrane made of an inorganic material, e.g., a ceramic. With respect to operation methods, either the dead end type or the cross flow type can be used.

In the separation by membrane filtration, since the membrane is often clogged by the microorganism, use may be made of a method in which membrane filtration is conducted after the microorganism is roughly removed by centrifugal separation or the like. Incidentally, the separated microorganism by itself can be used as a fertilizer, or the separated microorganism can be mixed with the nitrogen-containing composition according to the invention and used as a fertilizer.

EXAMPLES

The invention will be explained below in more detail by reference to Examples, but the invention should not be construed as being limited by the following Examples. In the Examples, a quantitative analysis of acids and saccharides and a quantitative analysis of amino acids were conducted using a high-performance liquid chromatography (LC) and an amino acid analyzer, respectively, under the following conditions. The content of proteins was determined by hydrolyzing a sample with hydrochloric acid and regarding the increase in the total amount of amino acids through the hydrolysis as the content of proteins.

<Analysis for Acids and Saccharides>
Column: ULTRON PS-80H, manufactured by Shinwa Chemical Industries Ltd.; 8.0 mm I.D.×30 cm
Eluent: water (perchloric acid) (1.8 mL of 60% aqueous solution of perchloric acid/1 L of $H_2O$)
Temperature: 60° C.
<Analysis for Amino Acids>
Apparatus: Hitachi Amino Acid Analyzer L-8900
Analysis Conditions: bioamino acid separation conditions; ninhydrin color development method (570 nm, 440 nm)
Reference: RF (Wako Amino Acid Mixture, Type ANII 0.8 mL+Type B 0.8 mL→10 mL)
Injection amount: 10 µL
<Hydrolysis for Determining Amount of Proteins>
A 10-mg or 100-mg portion of a sample was precisely weighed out and diluted with pure water to a given volume of 1 mL. A 200-µL portion thereof was taken out, dried, and heated at 150° C. for 1 hour in a hydrochloric acid atmosphere to hydrolyze the proteins.

The hydrolysis product was dried. Thereafter, 200 µL of pure water was added thereto to redissolve the hydrolysis product. This solution was filtered through a 0.45-µm filter, and the resultant filtrate was subjected to the analysis for amino acids.

<Production of Succinic Acid Fermentation Strain>
(A) Extraction of *Brevibacterium flavum* MJ233 Strain Genom DNA

*Brevibacterium flavum* MJ233 was deposited, under accession No. FERM P-3068, at the National Institute of Bioscience and Human-Technology, Agency of Industrial Science and Technology, Ministry of International Trade and Industry (currently, International Patent Organism Depositary, National Institute of Advanced Industrial Science and Technology) (Central 6, 1-1, Higashi 1-chome, Tsukaba-shi, Ibaraki-ken, 305-8566, Japan) on Apr. 28, 1975, and was transferred to international deposition under Budapest Treaty on May 1, 1981 and received accession No. FERM BP-1497. A strain of *Brevibacterium flavum* MJ233 was cultured, to the late stage of the logarithmic phase, in 10 mL of culture medium A [2 g of urea, 7 g of $(NH_4)_2SO_4$, 0.5 g of $KH_2PO_4$, 0.5 g of $K_2HPO_4$, 0.5 g of $MgSO_4.7H_2O$, 6 mg of $FeSO_4.7H_2O$, 6 mg of $MnSO_4.4$-$5H_2O$, 200 µg of biotin, 200 µg of thiamine, 1 g of yeast extract, 1 g of Casamino acid, and 20 g of glucose, all dissolved in 1 L of distilled water]. The cells were collected by centrifugal separation (10,000 G, 5 minutes). The cells obtained were suspended in 0.15 mL of a 10-mM NaCl/20-mM Tris buffer (pH 8.0)/1-mM EDTA·2Na solution containing lysozyme in a concentration of 10 mg/mL.

Subsequently, proteinase K was added to the suspension to a final concentration of 100 µg/mL, and this suspension was held at 37° C. for 1 hour. Furthermore, sodium dodecyl sulfate was added thereto to a final concentration of 0.5%, and this suspension was held at 50° C. for 6 hours to cause bacteriolysis.

To the liquid which had undergone bacteriolysis was added the same amount of a phenol/chloroform solution. This mixture was gently shaken at room temperature for 10 minutes and then wholly subjected to centrifugal separation (5,000 G; 20 minutes; 10-12° C.). The supernatant fraction was taken out, and sodium acetate was added thereto so as to result in a concentration of 0.3 M. Thereafter, a 2-fold amount of ethanol was added to and mixed with the fraction.

A precipitate was recovered through centrifugal separation (15,000 G, 2 minutes), washed with 70% ethanol, and then air-dried. To the DNA obtained was added 5 mL of a solution of 10-mM Tris buffer (pH 7.5)/1-mM EDTA·2Na. The resultant mixture was allowed to stand still at 4° C. overnight and used as a template DNA for PCR later.

(B) Construction of Plasmid for PC Promoter Substitution

DNA fragments were acquired from the N-end regions of a pyruvate carboxylase gene derived from a strain of *Brevibacterium flavum* MJ233, by PCR using as a template the DNA prepared in (A) above and using synthetic DNAs (sequence No. 1 and sequence No. 2) designed on the basis of the sequence of that gene of a *Corynebacterium glutamicum* ATCC 13032 strain (GenBank Database Accession No. BA000036, Cgl0689), the whole genom sequence of which has been reported. Incidentally, the DNA of sequence No. 1 was a DNA in which the 5'-end had been phosphorylated.

Reaction mixture composition: 1 µL of the template DNA, 0.2 µL of Pfx DNA polymerase (manufactured by Invitrogen Corp.), the attached buffer (×1 concentration), 0.3 µM of each primer, 1 mM of $MgSO_4$, and 0.25 µM of dNTPs were mixed together, and the total amount was adjusted to 20 µL.

Reaction temperature conditions: DNA thermal cycler PTC-200 (manufactured by MJ Research) was used to repeat a cycle 35 times, the cycle being composed of holding at 94° C. for 20 seconds, holding at 60° C. for 20 seconds, and holding at 72° C. for 1 minute. However, the 94° C.-holding in the first cycle was conducted for 1 minute and 20 seconds, and the 72° C.-holding in the final cycle was conducted for 4 minutes.

The amplification product was ascertained by subjecting the reaction mixture to separation by gel electrophoresis using 0.75% agarose (SeaKem GTG agarose; manufactured by FMC BioProducts) and then to visualization by staining with ethidium bromide. As a result, about 0.9 kb of fragments were detected. The desired DNA fragments were recovered from the gel using QIAQuick Gel Extraction Kit (manufactured by QIAGEN), and these fragments were used as PC gene N-end fragments.

On the other hand, TZ4 promoter fragments which were derived from a strain of *Brevibacterium flavum* MJ233 and constitutively highly showed expression were prepared by PCR using plasmid pMJPC1 (JP-A-2005-95169) as a template and using the synthetic DNAs described under sequence No. 3 and sequence No. 4. Incidentally, the DNA of sequence No. 4 was a DNA in which the 5'-end had been phosphorylated.

Reaction mixture composition: 1 µL of the template DNA, 0.2 µL of Pfx DNA polymerase (manufactured by Invitrogen Corp.) the attached buffer (×1 concentration), 0.3 µM of each primer, 1 mM of $MgSO_4$, and 0.25 µM of dNTPs were mixed together, and the total amount was adjusted to 20 µL.

Reaction temperature conditions: DNA thermal cycler PTC-200 (manufactured by MJ Research) was used to repeat a cycle 25 times, the cycle being composed of holding at 94° C. for 20 seconds, holding at 60° C. for 20 seconds, and holding at 72° C. for 30 seconds. However, the 94° C.-holding in the first cycle was conducted for 1 minute and 20 seconds, and the 72° C.-holding in the final cycle was conducted for 3 minutes.

The amplification product was ascertained by subjecting the reaction mixture to separation by gel electrophoresis using 1.0% agarose (Seakem GTG agarose; manufactured by FMC BioProducts) and then to visualization by staining with ethidium bromide. As a result, about 0.5 kb of fragments were detected. The desired DNA fragments were recovered from the gel using QIAQuick Gel Extraction Kit (manufactured by QIAGEN), and these fragments were used as TZ4 promoter fragments.

The PC gene N-end fragments and TZ4 promoter fragments prepared above were mixed together and ligated using Ligation Kit ver. 2 (manufactured by Takara Shuzo Co., Ltd.). Thereafter, the ligated fragments were cleaved with restriction enzyme Pst I and separated by gel electrophoresis using 1.0% agarose (SeaKem GTG agarose; manufactured by FMC BioProducts). About 1.0 kb of DNA fragments were recovered using QIAQuick Gel Extraction Kit (manufactured by QIAGEN), and these fragments were used as TZ4 promoter/PC gene N-end fragments. These DNA fragments were mixed with a DNA prepared by cleaving *Escherichia coli* plasmid pHSG299 (manufactured by Takara Shuzo Co., Ltd.) with Pst I, and were ligated therewith using Ligation Kit ver. 2 (manufactured by Takara Shuzo Co., Ltd.).

The plasmid DNA obtained was used to transform *Escherichia coli* (DH5α strain). The recombinant *Escherichia coli* thus obtained was applied to an LB agar medium containing 50 kanamycin and 50 µg/mL X-Gal. The clone which formed a white colony on the medium was cultured in a liquid in an ordinary way. Thereafter, the plasmid DNA was purified. The plasmid DNA obtained was cleaved with restriction enzyme Pst I. As a result, about 1.0 kb of insert fragments were observed. These fragments were named pMJPC 17.1.

DNA fragments were acquired from the 5'-upstream regions of a pyruvate carboxylase gene derived from a strain of *Brevibacterium flavum* MJ233, by PCR using as a template the DNA prepared in (A) above and using synthetic DNAs (sequence No. 5 and sequence No. 6) designed on the basis of the sequence of that gene of a *Corynebacterium glutamicum* ATCC 13032 strain (GenBank Database Accession No. BA000036), the whole genom sequence of which has been reported.

Reaction mixture composition: 1 µL of the template DNA, 0.2 µL of Pfx DNA polymerase (manufactured by Invitrogen Corp.), the attached buffer (×1 concentration), 0.3 µM of each primer, 1 mM of $MgSO_4$, and 0.25 µM of dNTPs were mixed together, and the total amount was adjusted to 20 µL.

Reaction temperature conditions: DNA thermal cycler PTC-200 (manufactured by MJ Research) was used to repeat a cycle 35 times, the cycle being composed of holding at 94° C. for 20 seconds, holding at 60° C. for 20 seconds, and holding at 72° C. for 30 seconds. However, the 94° C.-holding in the first cycle was conducted for 1 minute and 20 seconds, and the 72° C.-holding in the final cycle was conducted for 5 minutes.

The amplification product was ascertained by subjecting the reaction mixture to separation by gel electrophoresis using 1.0% agarose (SeaKem GTG agarose; manufactured by FMC BioProducts) and then to visualization by staining with ethidium bromide. As a result, about 0.7 kb of fragments were detected. The desired DNA fragments were recovered from the gel using QIAQuick Gel Extraction Kit (manufactured by QIAGEN).

The 5'-ends of the DNA fragments recovered were phosphorylated with T4 Polynucleotide Kinase (manufactured by Takara Shuzo Co., Ltd.). Thereafter, the DNA fragments were ligated to the Sma I site of *Escherichia coli* vector pUC 119 (manufactured by Takara Shuzo Co., Ltd.) using Ligation Kit ver. 2 (manufactured by Takara Shuzo Co., Ltd.). The plasmid DNA obtained was used to transform *Escherichia coli* (DH5α strain).

The recombinant *Escherichia coli* thus obtained was applied to an LB agar medium containing 50 µg/mL ampicillin and 50 µg/mL X-Gal. The clone which formed a white colony on the medium was cultured in a liquid in an ordinary way. Thereafter, the plasmid DNA was purified. The plasmid DNA obtained was subjected to a PCR reaction in which synthetic DNAs represented by sequence No. 7 and sequence No. 6 were used as primers.

Reaction mixture composition: 1 ng of the plasmid, 0.2 µL of Ex-Taq DNA polymerase (manufactured by Takara Shuzo Co., Ltd.), the attached buffer (×1 concentration), 0.2 µM of each primer, and 0.25 µM of dNTPs were mixed together, and the total amount was adjusted to 20 µL.

Reaction temperature conditions: DNA thermal cycler PTC-200 (manufactured by MJ Research) was used to repeat a cycle 20 times, the cycle being composed of holding at 94° C. for 20 seconds, holding at 60° C. for 20 seconds, and holding at 72° C. for 50 seconds. However, the 94° C.-holding in the first cycle was conducted for 1 minute and 20 seconds, and the 72° C.-holding in the final cycle was conducted for 5 minutes.

Whether insert DNA fragments were present or not was thus ascertained. As a result, a plasmid which gave about 0.7 kb of an amplification product was selected and named pMJPC5.1.

Subsequently, the pMJPC17.1 and the pMJPC5.1 each were cleaved with restriction enzyme Xba I, and then mixed together and ligated using Ligation Kit ver. 2 (manufactured by Takara Shuzo Co., Ltd.). The ligated fragments were cleaved with restriction enzyme Sac I and restriction enzyme Sph I, and the resultant DNA fragments were separated by gel electrophoresis using 0.75% agarose (SeaKem GTG agarose; manufactured by FMC BioProducts). About 1.75 kb of DNA fragments were recovered using QIAQuick Gel Extraction Kit (manufactured by QIAGEN).

DNA fragments obtained by inserting a TZ4 promoter between the 5'-upstream region and the N-end region of the PC gene were mixed with a DNA prepared by cleaving plasmid pKMB1 containing a sacB gene (JP-A-2005-95169) with Sac I and Sph I and were ligated thereto using Ligation Kit ver. 2 (manufactured by Takara Shuzo Co., Ltd.).

Figure 2:
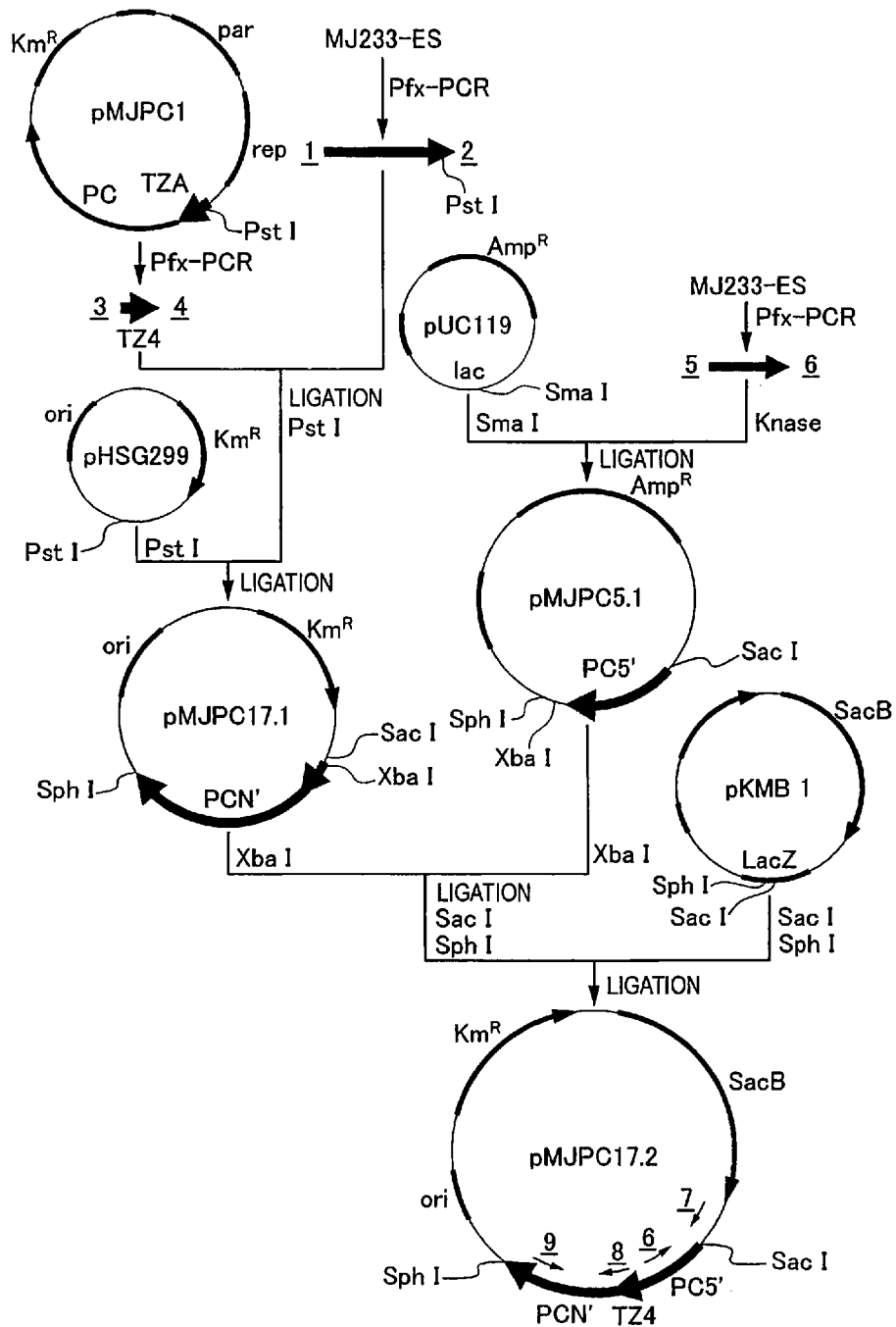
FIG. 2 is a chart which shows a procedure for constructing plasmid pMJPC17.2; each underlined numeral indicates a primer which has a sequence of the sequence number.

The plasmid DNA obtained was used to transform *Escherichia coli* (DH5α strain). The recombinant *Escherichia coli* thus obtained was applied to an LB agar medium containing 50 µg/mL kanamycin and 50 µg/mL X-Gal. The clone which formed a white colony on the medium was cultured in a liquid in an ordinary way. Thereafter, the plasmid DNA was purified. The plasmid DNA obtained was cleaved with restriction enzymes Sac I and Sph I. As a result, about 1.75 kb of insert fragments were observed. These fragments were named pMJPC17.2 (FIG. 2).

(C) Production of PC-Enhanced Strain

A plasmid DNA to be used for transforming *Brevibacterium Flavum* MJ233/ALDH (strain reduced in LDH activity: JP-A-2005-95169) was reprepared from an *Escherichia coli* JM110 strain which had been transformed using the plasmid DNA of pMJPC17.2 by the calcium chloride method (*Journal of Molecular Biology*, 53, 159, 1970).

The transformation of the *Brevibacterium Flavum* MJ233/ALDH strain was conducted by the electric pulse method (*Res. Microbiol.*, Vol. 144, pp. 181-185, 1993). The transformant obtained was applied to an LBG agar medium [10 g of tripton, 5 g of yeast extract, 5 g of NaCl, 20 g of glucose, and 15 g of agar were dissolved in 1 L of distilled water] which contained kanamycin in a concentration of 25 μg/mL.

The strain that grew on the medium was a plasmid in which pMJPC 17.2 was unable to be duplicated in the cells of the *Brevibacterium flavum* MJ233 strain. Consequently, homologous recombination should have occurred between the PC gene of the plasmid and the same gene present on the genome of the *Brevibacterium flavum* MJ233 strain and, as a result, a kanamycin-resistant gene and a sacB gene both derived from that plasmid should have been inserted into the genome.

Subsequently, the homologous recombinant strain was cultured in a liquid LBG medium containing kanamycin in a concentration of 25 μg/mL. A portion of this culture medium which corresponded to a number of cells of about 1,000,000 was applied to an LBG medium containing 10% sucrose. As a result, several tens of strains which were thought to have undergone second homologous recombination and resultant elimination of the sacB gene and hence become not sensitive to sucrose were obtained.

The strains thus obtained include ones in which a TZ4 promoter derived from pMJPC17.2 has been inserted upstream from the PC gene and ones which have returned to the wild type. Whether a PC gene is of the promoter-substituted type or the wild type can be easily ascertained by directly subjecting the cells obtained by liquid culture in an LBG medium to a PCR reaction and then to PC gene detection.

When analyzed with a TZ4 promoter and primers (sequence No. 8 and sequence No. 9) for PCR amplification of PC genes, a PC gene of the promoter-substituted type should give a DNA fragment of 678 bp. The strains which had become not sensitive to sucrose were analyzed by that method. As a result, a strain in which a TZ4 promoter had been inserted was selected and named *Brevibacterium flavum* MJ233/PC-5/ALDH.

<Preparation of Succinic Acid Fermentation Broth with Jar Fermenter>

(A) Seed Culture

A 100-mL portion of a culture medium obtained by dissolving 4 g of urea, 14 g of ammonium sulfate, 0.5 g of monopotassium phosphate, 0.5 g of dipotassium phosphate, 0.5 g of magnesium sulfate heptahydrate, 20 mg of ferrous sulfate heptahydrate, 20 mg of manganese sulfate hydrate, 200 μg of D-biotin, 200 μg of thiamin hydrochloride, 1 g of yeast extract, and 1 g of Casamino acid in distilled water and adjusting the total volume to 1,000 mL was introduced into a 500-mL Erlenmeyer flask and sterilized by heating at 121° C. for 20 minutes. The contents were cooled to room temperature, and 4 mL of 50% aqueous glucose solution which had been sterilized beforehand was added thereto. A strain of the *Brevibacterium flavum* MJ233/PC-5/ΔLDH constructed above was inoculated thereinto and cultured at 30° C. for 16 hours with shaking (160 rpm).

(B) Main Culture

A 2.0-L portion of a culture medium prepared by dissolving 3.0 g of ammonium sulfate, 6.7 g of 85% phosphoric acid, 4.9 g of potassium chloride, 1.5 g of magnesium sulfate heptahydrate, 120 mg of ferrous sulfate heptahydrate, 120 mg of manganese sulfate hydrate, 30.0 g of corn steep liquor (manufactured by Oji Cornstarch Co., Ltd.), 11.0 g of 10-N aqueous potassium hydroxide solution, and 2.5 g of an antifoaming agent (CE457, manufactured by Nippon Oils & Fats Co., Ltd.) in distilled water was introduced into a 5-L fermenter and sterilized by heating at 121° C. for 20 minutes. After the culture medium was cooled to room temperature, 28% ammonium water was added thereto to adjust the pH thereof to 7.0. To this culture medium were added 15 mL of an aqueous solution which contained D-biotin and thiamin hydrochloride in a concentration of 0.2 g/L each and which had been sterilized with a filter beforehand and 110 mL of an aqueous solution which contained sucrose in a concentration of 720 g/L and which had been sterilized beforehand. Thereto was added 100 mL of the seed culture medium described above. The resultant medium was held at 30° C.

Main culture was initiated under the aeration, back pressure, and stirring conditions of 3.0 L/min, 0.05 MPa, and 750 rpm, respectively, while keeping the pH above 7.2 using 28% ammonia water. The dissolved-oxygen concentration decreased to substantially 0 and thereafter began to rise. At the time when the dissolved-oxygen concentration reached 1 ppm, about 5.3 g of 72% aqueous sucrose solution which had been sterilized beforehand was added thereto. As a result, the dissolved-oxygen concentration decreased to 0 again. Every time when the dissolved-oxygen concentration increased again, addition of the aqueous sucrose solution was repeated in the manner described above. Thus, the culture was continued for 19 hours after the initiation thereof.

(C) Succinic Acid Production Reaction

In distilled water were dissolved 1.6 g of 85% phosphoric acid, 1.1 g of magnesium sulfate heptahydrate, 43 mg of ferrous sulfate heptahydrate, 43 mg of manganese sulfate hydrate, and 2.86 g of 10-N aqueous potassium hydroxide solution. The volume of the solution was adjusted to 42 mL. Thereafter, the solution was sterilized by heating at 121° C. for 20 minutes to produce a concentrated reaction medium.

Forty-two milliliters of the concentrated reaction medium which had been cooled to room temperature, 530 mL of 720 g/L aqueous sucrose solution which had been sterilized beforehand, 1.2 L of sterilized water, 20 mL of an aqueous solution which contained D-biotin and thiamin hydrochloride in a concentration of 0.2 g/L each and which had been sterilized with a filter beforehand, and 675 mL of the culture medium obtained by the main culture were introduced into a 5-L jar fermenter to initiate a reaction.

The reaction was continued at a reaction temperature of 40° C. and a stirring speed of 150 rpm while keeping the pH at 7.35 by sequential addition of a neutralizer (171 g of ammonium hydrogen carbonate, 354 g of 28% ammonia water, and 529 g of distilled water). The reaction was terminated at the time when the amount of the sucrose remaining in the liquid reaction mixture had decreased to 0.1 g/L or less.

The succinic acid fermentation broth thus prepared was centrifuged (15,000 G, 5 minutes), and the resultant supernatant was recovered (hereinafter often referred to as succinic acid fermentation broth).

This supernatant was analyzed for composition, and the results thereof are shown in the following Table 2.

TABLE 2

Composition of succinic acid fermentation broth

| Products | Accumulated concentration (g/L) | Accumulated concentration (wt %) |
| --- | --- | --- |
| Succinic acid | 91.3 | 8.65 |
| Malic acid | 9.8 | 0.93 |
| Pyruvic acid | 0.5 | 0.05 |
| Acetic acid | 13.2 | 1.25 |
| Fumaric acid | 2.7 | 0.26 |
| α-Ketoglutaric acid | 1.1 | 0.10 |
| α-Ketovaline | 1.1 | 0.10 |
| Alanine | 2.5 | 0.24 |
| Valine | 0.8 | 0.08 |
| Glutamic acid | 0.1 | 0.01 |
| Trehalose | 1.2 | 0.11 |
| Proteins | 1.2 | 0.11 |

(density, 1.056 g/mL)

Example 1

<Protonation>

The pH of 1,500 g of the succinic acid fermentation broth was adjusted to 2.5 by adding 98% sulfuric acid thereto. The amount of the sulfuric acid which was added here was 150 g.

<Extraction>

The aqueous succinic acid solution to which sulfuric acid had been added was mixed with methyl ethyl ketone (hereinafter often abbreviated to MEK) and the mixture was subjected to liquid-liquid separation, using a jacketed static mixer (Noritake 1/4(1)-N40-174-0 (inner diameter, 5 mm; number of elements, 24)) and a three-vessel type jacketed settler in which the vessels had capacities of 600 mL, 400 mL, and 300 mL, respectively. Thus, the succinic acid was continuously extracted.

Specifically, 1,650 g of the aqueous succinic acid solution and 825 g of an MEK solution to which 10% water had been added ([MEK solution (weight)]/[aqueous succinic acid solution (weight)]=0.5 (weight/weight)) were fed, at rates of 20 g/min and 10 g/min, respectively, to the static mixer, the temperature of which was controlled by passing 30° C. warm water through the jacket. The suspension discharged was fed to the first vessel of the three-vessel type settler, the temperature of which was controlled by passing 30° C. warm water through the jacket, and was separated into liquids. The raffinate phase was continuously discharged from the bottom of the first vessel.

The extract phase overflowed the dam disposed between the first and second vessels, and was fed to the second vessel. In the second vessel, the insoluble components which had been unable to be separated in the first vessel were sedimented to the bottom. The resultant clear extract phase only was allowed to overflow the dam disposed between the second and third vessels, and was fed to the third vessel. Furthermore, in the third vessel, the clear extract phase was allowed to overflow a part located in the vicinity of the liquid surface, and the extract phase was recovered.

After completion of the continuous extraction, the extract phase and raffinate phase which remained in each vessel were recovered, and the intermediate phase in the first vessel and the insoluble components remaining on the bottom of the second vessel were recovered. The recovered extract phase, raffinate phase, and intermediate phase amounted to 688 g, 1,613 g, and 173 g, respectively.

The raffinate phase recovered in an amount of 1,613 g was subjected to continuous extraction using a jacketed stirring-type continuous extraction column (number of theoretical plates, 10) having an inner diameter of 20 mm and a height of 2 m to recover succinic acid. In this operation, the raffinate phase was fed through the column top at a rate of 200 g/hr, and an MEK solution regulated beforehand so as to have a water content of 10% by weight was fed through the column bottom at a rate of 200 g/hr, thereby conducting continuous extraction.

The raffinate phase formed a continuous phase, and the MEK phase formed a dispersed phase (the lighter liquid was dispersed). The temperature of the extraction column was regulated to 30° C. by passing warm water through the jacket. Finally, an extract phase and a raffinate phase were recovered in amounts of 1,777 g and 1,449 g, respectively.

The raffinate phase was analyzed for composition. The results obtained are shown in the following Table 3.

TABLE 3

Composition of raffinate phase

| Components | Composition (wt %) |
| --- | --- |
| Ammonium sulfate | 13.1 |
| Organic acids | 0.8 |
| Saccharides | 0.1 |
| Amino acids, proteins | 0.4 |
| MEK | 4.3 |

<Distillation>

The MEK dissolved in a slight amount in the raffinate phase was removed by distillation using an atmospheric-pressure continuous distillation apparatus which was equipped with a column having an inner diameter of 20 mm and packed, to a height of 30 cm, with a coil packing having a diameter of 5 mm and which was further equipped with a 500-mL round-bottom flask and a reflux condenser. About 300 mL of the raffinate phase was introduced into the 500-mL round-bottom flask. Thereafter, the raffinate phase was boiled while heating the round-bottom flask with an oil bath, and the interior of the system was stabilized while conducting total refluxing. The temperature of the oil bath was regulated to 110° C. At this time, the column top temperature was 74° C. (azeotropic temperature), and the column bottom temperature was 102° C.

After it was ascertained that the interior of the system had stabilized, the reflux ratio was set at 1, and continuous discharge of the distillate, continuous feeding of the feed liquid to the middle stage of the packed column, and continuous discharge of the bottoms were initiated. The feed liquid was heated beforehand to 60° C. with a preheater, before being fed to the packed column. After the distillation, the bottoms had amounted to 1,379 g and the MEK concentration had decreased to 45 ppm.

On the other hand, the recovered distillate was a slightly yellow azeotropic composition composed of MEK and water (MEK, 89% by weight; water, 11% by weight).

<Neutralization>

The pH of the liquid from which the MEK had been removed by distillation was measured and was found to be about 3. The pH thereof was hence adjusted to 6 with 26% by weight ammonia water.

<Concentration>

The neutralized liquid was concentrated with an evaporator to recover 476 g of a concentrate having an ammonium sulfate concentration of 41% by weight.

<Crystallization>

The concentrate was transferred to a 1,000-mL jacked stirring vessel. While passing 45° C. warm water through the jacket, the internal pressure of the crystallization vessel was gradually lowered to 7 kPa with stirring. After the internal pressure had decreased to 7 kPa (internal temperature, about 40° C.), 95 g of water was distilled off (20% by weight based on the feed liquid) while regulating the pressure, and ammonium sulfate was precipitated thereby. After the given amount of water had been distilled off, the internal pressure of the crystallization vessel was returned to atmospheric pressure, and the temperature of the warm water to be passed through the jacket was changed to 40° C. to age the contents for about 1 hour.

The ammonium sulfate slurry obtained was filtered under vacuum to separate the slurry into a wet cake and a crystallization mother liquid. The wet cake obtained was dried in an 80° C. hot-air drying oven for about 7 hours. As a result, 87 g of ammonium sulfate and 288 g of a crystallization mother liquid were recovered.

The ammonium sulfate and the crystallization mother liquid were analyzed for composition, and the results thereof are shown in the following Table 4 and Table 5, respectively.

TABLE 4

Composition of ammonium sulfate (obtained by crystallization)

| Components | Composition (wt %) |
| --- | --- |
| Ammonium sulfate | 96.4 |
| Organic acids | 0.6 |
| Saccharides | 0.1 |
| Amino acids, proteins | 0.3 |
| MEK | 0.0 |
| Total nitrogen | 20.5% |
| Ammonia nitrogen | 20.4% |

TABLE 5

Composition of crystallization mother liquid

| Components | Composition (wt %) |
| --- | --- |
| Ammonium sulfate | 39.2 |
| Organic acids | 4.0 |
| Saccharides | 0.6 |
| Amino acids, proteins | 1.9 |
| MEK | 0.0 |
| Viscosity (40° C.) | 3.7 cP |

A half of the crystallization mother liquid recovered was recycled. The remaining half was dried on a hot plate heated at 150° C. As a result, 67 g of a brown ammonium sulfate powder was recovered.

The ammonium sulfate obtained was analyzed for composition, and the results thereof are shown in the following Table 6.

TABLE 6

Composition of ammonium sulfate (obtained by drying crystallization mother liquid)

| Components | Composition (wt %) |
| --- | --- |
| Ammonium sulfate | 83.8 |
| Organic acids | 8.6 |
| Saccharides | 1.2 |
| Amino acids, proteins | 4.0 |
| MEK | 0.0 |
| Total nitrogen | 18.3% |
| Ammonia nitrogen | 17.8% |

Example 2

<Protonation/Extraction/Neutralization/Concentration>

A succinic acid fermentation broth was protonated and subsequently extracted with an MEK solution in the same manner as in Example 1, except that the amount of the succinic acid fermentation broth to be used was changed from 1,500 g to 1,000 g.

The raffinate phase was subjected to distillation and neutralization and then concentrated to an ammonium sulfate concentration of 40% by weight. As a result, 329 g of a concentrate was recovered.

<Crystallization>

The concentrate was mixed with a half, i.e., 144 g, of the crystallization mother liquid recovered in the crystallization step of Example 1. The resultant mixture was subjected to crystallization, filtration, and drying in the same manner as in Example 1. As a result, 86 g of ammonium sulfate and 288 g of a crystallization mother liquid were recovered.

The ammonium sulfate obtained and the crystallization mother liquid obtained were analyzed for composition, and the results thereof are shown in Table 7 and Table 8, respectively.

TABLE 7

Composition of ammonium sulfate (obtained by crystallization)

| Components | Composition (wt %) |
| --- | --- |
| Ammonium sulfate | 96.2 |
| Organic acids | 0.8 |
| Saccharides | 0.1 |
| Amino acids, proteins | 0.4 |
| MEK | 0.0 |
| Total nitrogen | 20.5% |
| Ammonia nitrogen | 20.4% |

TABLE 8

Composition of crystallization mother liquid

| Components | Composition (wt %) |
| --- | --- |
| Ammonium sulfate | 38.4 |
| Organic acids | 4.7 |
| Saccharides | 0.7 |
| Amino acids, proteins | 2.2 |
| MEK | 0.0 |
| Viscosity (40° C.) | 4.0 cP |

A half of the crystallization mother liquid recovered was recycled. The remaining half was dried on a hot plate heated at 150° C. As a result, 65 g of a brown ammonium sulfate powder was recovered.

The composition of the ammonium sulfate obtained is shown in the following Table 9.

TABLE 9

Composition of ammonium sulfate (obtained by drying crystallization mother liquid)

| Components | Composition (wt %) |
|---|---|
| Ammonium sulfate | 81.6 |
| Organic acids | 10.0 |
| Saccharides | 1.4 |
| Amino acids, proteins | 4.6 |
| MEK | 0.0 |
| Total nitrogen | 18.0% |
| Ammonia nitrogen | 17.3% |

Example 3

A half of the crystallization mother liquid was further subjected repeatedly to the extraction to crystallization operations five times while being recycled, in the same manner as in Example 2.

The ammonium sulfate obtained by the crystallization, the ammonium sulfate obtained by drying the crystallization mother liquid, and the crystallization mother liquid therefor were analyzed for composition, and the results thereof are shown in the following Table 10.

whether the composition exerted any adverse influence on the budding and subsequent growth of komatsuna (*Brassica rapa* var. *perviridis*) and to examine the degree of the influence. As a result, the plant showed no growth abnormality due to a harmful substance.

The mixed nitrogen-containing composition was analyzed for components as a fertilizer, and the results thereof are shown in the following Table 11.

TABLE 11

Results of analysis of nitrogen-containing composition for components as fertilizer

| Total nitrogen | 19.08 wt % |
|---|---|
| Ammonia nitrogen | 18.14 wt % |
| Total phosphoric acid | 0.17 wt % |
| Total potassium | 0.85 wt % |
| Thiocyanates | <0.05% |
| Arsenic | <0.1 mg/kg |
| Nitrous acid | <0.01 wt % |
| Biuret nitrogen | <0.05 wt % |
| Sulfamic acids | <0.05 wt % |

Example 4

Ammonium sulfate was recovered in the same manner as in Example 1, except that distillation and neutralization were conducted in the reverse order. Handleability in each opera-

TABLE 10

Compositions of ammonium sulfate and crystallization mother liquid

| | | | Initial | 1st cycle | 2nd cycle | 3rd cycle | 4th cycle | 5th cycle |
|---|---|---|---|---|---|---|---|---|
| Ammonium sulfate (crystallized) | Ammonium sulfate | wt % | 96.4 | 96.2 | 96.2 | 96.1 | 96.1 | 96.1 |
| | Organic acids | | 0.6 | 0.8 | 0.8 | 0.8 | 0.8 | 0.8 |
| | Saccharides | | 0.1 | 0.1 | 0.1 | 0.1 | 0.1 | 0.1 |
| | Amino acids, proteins | | 0.3 | 0.4 | 0.4 | 0.4 | 0.4 | 0.4 |
| | MEK | | 0 | 0 | 0 | 0 | 0 | 0 |
| | N  Total nitrogen | | 20.5 | 20.5 | 20.4 | 20.4 | 20.4 | 20.4 |
| | Ammonia nitrogen | | 20.4 | 20.4 | 20.4 | 20.4 | 20.4 | 20.4 |
| Ammonium sulfate (direct drying) | Ammonium sulfate | wt % | 83.8 | 81.6 | 80.6 | 80.2 | 79.9 | 79.8 |
| | Organic acids | | 8.6 | 10.0 | 10.7 | 10.9 | 11.1 | 11.1 |
| | Saccharides | | 1.2 | 1.4 | 1.5 | 1.5 | 1.6 | 1.6 |
| | Amino acids, proteins | | 4.0 | 4.6 | 4.9 | 5.1 | 5.1 | 5.1 |
| | MEK | | 0 | 0 | 0 | 0 | 0 | 0 |
| | N  Total nitrogen | | 18.3 | 18.0 | 17.8 | 17.7 | 17.7 | 17.7 |
| | Ammonia nitrogen | | 17.8 | 17.3 | 17.1 | 17.0 | 17.0 | 16.9 |
| Filtrate | Ammonium sulfate | wt % | 39.2 | 38.4 | 38.1 | 38.0 | 37.9 | 37.9 |
| | Organic acids (total) | | 4.0 | 4.7 | 5.0 | 5.2 | 5.3 | 5.3 |
| | Malic acid | | 3.0 | 3.5 | 3.7 | 3.8 | 3.9 | 3.9 |
| | α-Ketoglutaric acid | | 0.4 | 0.5 | 0.6 | 0.6 | 0.6 | 0.6 |
| | Others | | 0.6 | 0.7 | 0.7 | 0.8 | 0.8 | 0.8 |
| | Saccharides | | 0.6 | 0.7 | 0.7 | 0.7 | 0.7 | 0.7 |
| | Amino acids, proteins (total) | | 1.9 | 2.2 | 2.3 | 2.4 | 2.4 | 2.4 |
| | Alanine | | 1.2 | 1.4 | 1.5 | 1.5 | 1.5 | 1.5 |
| | Valine | | 0.4 | 0.4 | 0.5 | 0.5 | 0.5 | 0.5 |
| | Proteins | | 0.3 | 0.4 | 0.4 | 0.4 | 0.4 | 0.4 |
| | Others | | 0 | 0 | 0 | 0 | 0 | 0 |
| | MEK | | 0 | 0 | 0 | 0 | 0 | 0 |
| | Viscosity | cP | 3.7 | 4.0 | 5.2 | 5.0 | 5.1 | 5.3 |

A nitrogen-containing composition obtained by mixing all the ammonium sulfate recovered was subjected to a seedling test using reagent-grade ammonium sulfate (special-grade reagent) as a control fertilizer, in order to examine as to tion and the ammonium sulfate recovered were substantially the same as in Example 1. However, the distillate (azeotropic composition composed of MEK and water) obtained by distillation was yellow.

Comparative Example 1

A crystallization mother liquid was repeatedly subjected to the extraction to crystallization operations five times to recover ammonium sulfate while being recycled, in the same manner as in Example 1, except that the whole crystallization mother liquid was recycled. The results obtained are shown in the following Table 12. As the recycling proceeded, the period required for the ammonium sulfate slurry to be filtered under vacuum [filter paper (5C)] increased. In the fifth cycle, solid-liquid separation by vacuum filtration was impossible and a bench type centrifugal filter (filter cloth) was used to conduct solid-liquid separation at about 3,000 G.

The ammonium sulfate obtained by the crystallization, the ammonium sulfate obtained by drying the crystallization mother liquid, and the crystallization mother liquid therefor were analyzed for composition, and the results thereof are shown in the following Table 12.

TABLE 12

Compositions of ammonium sulfate and crystallization mother liquid

| | | | Initial | 1st cycle | 2nd cycle | 3rd cycle | 4th cycle | 5th cycle |
|---|---|---|---|---|---|---|---|---|
| Ammonium sulfate (crystallized) | Ammonium sulfate | wt % | 96.4 | 96.1 | 95.6 | 95.3 | 95.0 | 94.8 |
| | Organic acids | | 0.6 | 0.9 | 1.1 | 1.3 | 1.5 | 1.7 |
| | Saccharides | | 0.1 | 0.1 | 0.2 | 0.2 | 0.2 | 0.2 |
| | Amino acids, proteins | | 0.3 | 0.4 | 0.5 | 0.6 | 0.7 | 0.8 |
| | MEK | | 0 | 0 | 0 | 0 | 0 | 0 |
| | N  Total nitrogen | | 20.5 | 20.4 | 20.4 | 20.3 | 20.3 | 20.2 |
| | Ammonia nitrogen | | 20.4 | 20.4 | 20.3 | 20.2 | 20.2 | 20.1 |
| Mother liquor | Ammonium sulfate | wt % | 39.2 | 37.5 | 34.4 | 32.3 | 30.9 | 30.0 |
| | Organic acids (total) | | 4.0 | 5.4 | 6.9 | 8.2 | 9.3 | 10.4 |
| | Malic acid | | 3.0 | 4.0 | 5.1 | 6.0 | 6.9 | 7.7 |
| | α-Ketoglutaric acid | | 0.4 | 0.6 | 0.7 | 0.9 | 1.0 | 1.1 |
| | Others | | 0.6 | 0.8 | 1.1 | 1.3 | 1.4 | 1.6 |
| | Saccharides | | 0.6 | 0.8 | 1.0 | 1.2 | 1.3 | 1.5 |
| | Amino acids, proteins (total) | | 1.9 | 2.5 | 3.2 | 3.8 | 4.3 | 4.8 |
| | Alanine | | 1.2 | 1.6 | 2.0 | 2.4 | 2.7 | 3.0 |
| | Valine | | 0.4 | 0.5 | 0.6 | 0.7 | 0.8 | 0.9 |
| | Proteins | | 0.3 | 0.4 | 0.5 | 0.6 | 0.7 | 0.8 |
| | Others | | 0 | 0 | 0.1 | 0.1 | 0.1 | 0.1 |
| | MEK | | 0 | 0 | 0 | 0 | 0 | 0 |
| | Viscosity | cP | 3.7 | 4.0 | 4.7 | 5.2 | 5.7 | 6.5 |

While the invention has been described in detail and with reference to specific embodiments thereof, it will be apparent to one skilled in the art that various changes and modifications can be made therein without departing from the spirit and scope thereof. This application is based on a Japanese patent application filed on Jan. 15, 2010 (Application No. 2010-007306), the entire contents thereof being incorporated herein by reference.

The invention claimed is:

1. A process for producing a nitrogen-containing composition from an aqueous solution which contains an ammonium salt of aliphatic carboxylic acid obtained from a biological starting material, while recovering at least one member selected from an aliphatic carboxylic acid, a salt of aliphatic carboxylic acid and an ammonium salt of sulfuric acid from the solution, wherein the process comprises the following steps (1) to (3):
   (1) a crystallization step of concentrating and crystallizing the ammonium salt of sulfuric acid from an aqueous solution that contains the ammonium salt of sulfuric acid,
   (2) a solid-liquid separation step of solid-liquid separating the ammonium salt of sulfuric acid obtained in the crystallization step, and
   (3) a crystallization mother liquid recycling step of recycling a crystallization mother liquid obtained in the solid-liquid separation step to at least one step selected from the crystallization step and one or more steps that precede the crystallization step, in which not all of the crystallization mother liquid is recycled.

2. The process for producing a nitrogen-containing composition according to claim 1, which further comprises a crystallization mother liquid drying step of evaporating to dryness, the crystallization mother liquid obtained in the solid-liquid separation step with a dryer to recover an ammonium salt of sulfuric acid.

3. The process for producing a nitrogen-containing composition according to claim 1, which comprises: a contact step of adding sulfuric acid to the aqueous solution that contains an ammonium salt of aliphatic carboxylic acid obtained from a biological starting material and, thereafter, mixing and contacting the aqueous solution with a solvent capable of phase separation; and a phase separation step of phase separating the liquid after the contact step.

4. The process for producing a nitrogen-containing composition according to claim 3, which comprises an organic-solvent removal step of distilling the aqueous solution resulting from the phase separation step to remove the solvent from the aqueous solution.

5. The process for producing a nitrogen-containing composition according to claim 4, which comprises a concentration step of concentrating the aqueous solution from which the organic solvent has been removed to increase the concentration of the ammonium salt of sulfuric acid in the aqueous solution.

6. The process for producing a nitrogen-containing composition according to claim 3, which comprises a raffinate neutralization step of adding an alkali to the aqueous solution resulting from the phase separation step to adjust the pH to a value in the range of 4-8.

7. The process for producing a nitrogen-containing composition according to claim 6, wherein the alkali to be used in the raffinate neutralization step is ammonia.

8. The process for producing a nitrogen-containing composition according to claim 6, wherein the raffinate neutralization step is conducted after the organic-solvent removal step.

9. The process for producing a nitrogen-containing composition according to claim 6, wherein the raffinate neutralization step is conducted before the concentration step.

10. The process for producing a nitrogen-containing composition according to claim 1, wherein the total amount of organic acids, saccharides, amino acids, and proteins contained in the crystallization mother liquid to be recycled in the crystallization mother liquid recycling step is 0.1-15% by weight based on the crystallization mother liquid obtained in the solid-liquid separation step.

11. The process for producing a nitrogen-containing composition according to claim 10, wherein the total amount of organic acids contained in the crystallization mother liquid to be recycled in the crystallization mother liquid recycling step is 0.1-10% by weight based on the crystallization mother liquid obtained in the solid-liquid separation step.

12. The process for producing a nitrogen-containing composition according to claim 1, wherein the amount of the crystallization mother liquid to be recycled in the crystallization mother liquid recycling step is 10% by weight or more but less than 80% by weight based on the crystallization mother liquid obtained in the solid-liquid separation step.

13. A nitrogen-containing composition produced by the process for production according to claim 1, wherein a total amount of nitrogen contained in the nitrogen-containing composition is 15% by weight or more but less than 21% by weight and at least 90% by weight of the total nitrogen is ammonium nitrogen.

14. A fertilizer material which comprises the nitrogen-containing composition according to claim 13.

15. A fertilizer which comprises the nitrogen-containing composition according to claim 13.

* * * * *

SEQUENCE LISTING

<160> NUMBER OF SEQ ID NOS: 9

<210> SEQ ID NO 1
<211> LENGTH: 24
<212> TYPE: DNA
<213> ORGANISM: Artificial sequence
<220> FEATURE:
<223> OTHER INFORMATION: primer

<400> SEQUENCE: 1
acgaagtgac tgctatcacc cttg                                          24

<210> SEQ ID NO 2
<211> LENGTH: 23
<212> TYPE: DNA
<213> ORGANISM: Artificial sequence
<220> FEATURE:
<223> OTHER INFORMATION: primer

<400> SEQUENCE: 2
cagaacttta ctgcatccgc aca                                        23

<210> SEQ ID NO 3
<211> LENGTH: 36
<212> TYPE: DNA
<213> ORGANISM: Artificial sequence
<220> FEATURE:
<223> OTHER INFORMATION: primer

<400> SEQUENCE: 3
gtggatgaga caggactatc tagagctaca gtgaca                          36

<210> SEQ ID NO 4
<211> LENGTH: 33
<212> TYPE: DNA
<213> ORGANISM: Artificial sequence
<220> FEATURE:
<223> OTHER INFORMATION: primer

<400> SEQUENCE: 4
agaattgatt ataggtcact aaaactaatt cag                             33

<210> SEQ ID NO 5
<211> LENGTH: 25
<212> TYPE: DNA
<213> ORGANISM: Artificial sequence
<220> FEATURE:
<223> OTHER INFORMATION: primer

<400> SEQUENCE: 5
gtaggtatca cccatgcaca agttg                                      25

<210> SEQ ID NO 6
<211> LENGTH: 23
<212> TYPE: DNA
<213> ORGANISM: Artificial sequence
<220> FEATURE:
<223> OTHER INFORMATION: primer

<400> SEQUENCE: 6
cctagtatcg taaccccga ttc                                         23

<210> SEQ ID NO 7
<211> LENGTH: 21
<212> TYPE: DNA
<213> ORGANISM: Artificial sequence
<220> FEATURE:
<223> OTHER INFORMATION: primer

<400> SEQUENCE: 7
gttttcccag tcacgacgtt g                                          21

<210> SEQ ID NO 8
<211> LENGTH: 24
<212> TYPE: DNA
<213> ORGANISM: Artificial sequence
<220> FEATURE:
<223> OTHER INFORMATION: primer

<400> SEQUENCE: 8
actggcattg atgtcgatcc agca                                       24

<210> SEQ ID NO 9
<211> LENGTH: 23
<212> TYPE: DNA
<213> ORGANISM: Artificial sequence
<220> FEATURE:

```
<223> OTHER INFORMATION: primer

<400> SEQUENCE: 9
ctgttgccaa tttgcgaagc tca                                          23
```